United States Patent [19]

Risberg

[11] 4,038,515

[45] July 26, 1977

[54] ASYMMETRICAL A.C. WELDER

[75] Inventor: Robet L. Risberg, Brookfield, Wis.

[73] Assignee: Miller Electric Manufacturing Company, Appleton, Wis.

[21] Appl. No.: 575,685

[22] Filed: May 8, 1975

[51] Int. Cl.² .............................................. B23K 9/10
[52] U.S. Cl. ..................... 219/131 R; 219/131 WR; 323/25
[58] Field of Search ....... 219/131 R, 131 WR, 131 F, 219/135; 323/24, 25

[56] References Cited

U.S. PATENT DOCUMENTS

| 3,364,334 | 1/1968 | Sato et al. | 219/131 R |
| 3,526,747 | 9/1970 | Keller et al. | 219/131 WR |
| 3,598,954 | 8/1971 | Iceland | 219/131 WR |
| 3,728,515 | 4/1973 | Gedgaudas | 219/135 |
| 3,818,177 | 6/1974 | Needham et al. | 219/131 R |
| 3,845,380 | 10/1974 | Lepp et al. | 323/24 |
| 3,904,846 | 9/1975 | Risberg | 219/135 |

FOREIGN PATENT DOCUMENTS

| 44-6454 | 12/1965 | Japan | 219/131 R |
| 45-30932 | 10/1970 | Japan | 219/131 R |
| 276,289 | 6/1969 | U.S.S.R. | 219/131 R |

Primary Examiner—J. V. Truhe
Assistant Examiner—Clifford C. Shaw
Attorney, Agent, or Firm—Sughrue, Rothwell, Mion, Zinn and Macpeak

[57] ABSTRACT

A constant potential single phase A.C. power welding source is connected to a thyristor network and an energy storing inductor to create a square wave welding current that is adjustable in height, and is further adjustable to allow either half-cycle to be wider than the other, the sum of two adjacent half-cycles always equaling 360°. The welding current is forced to reverse rapidly by a substantial voltage to insure conduction when the welding load is an arc to an aluminum work piece, and the aluminum tends to rectify. The heights of the positive and negative half-cycles are simultaneously adjustable in response to manual control and feedback signals. In addition, the ratio of the heights of the positive and negative half-cycles can be other than 1:1 by selectively enabling a conduction path through a different number of turns on the inductor during the negative and positive half-cycles, such enabling being either continuous or on an adaptive feedback basis as a function of arc length as determined by arc voltage. The height difference is effective in a step fashion since the total ampere-turns must remain constant. The thyristor network may also be re-connected for full-wave rectification for D.C. welding.

2 Claims, 9 Drawing Figures

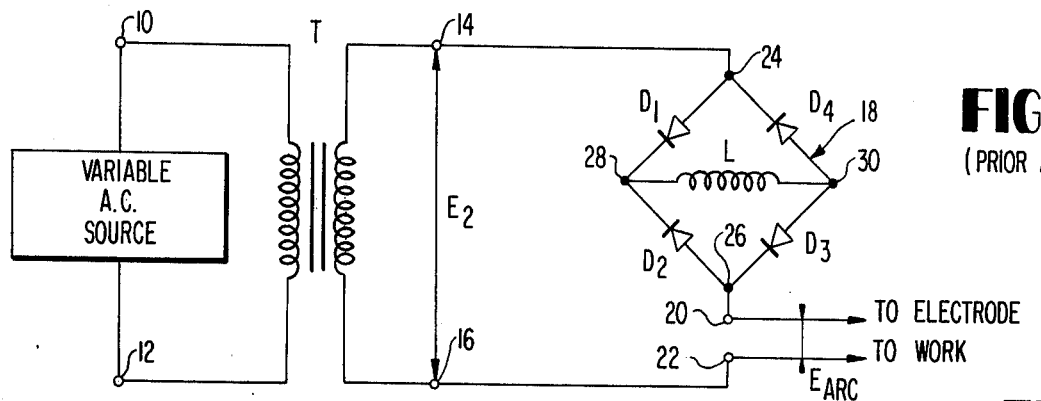
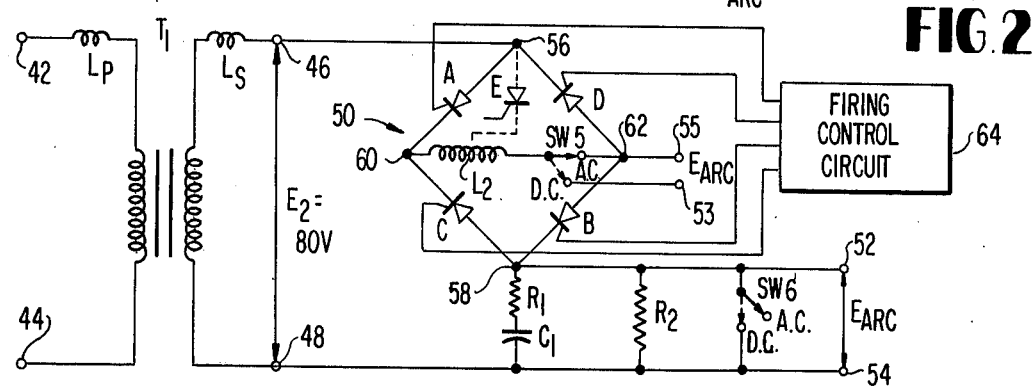
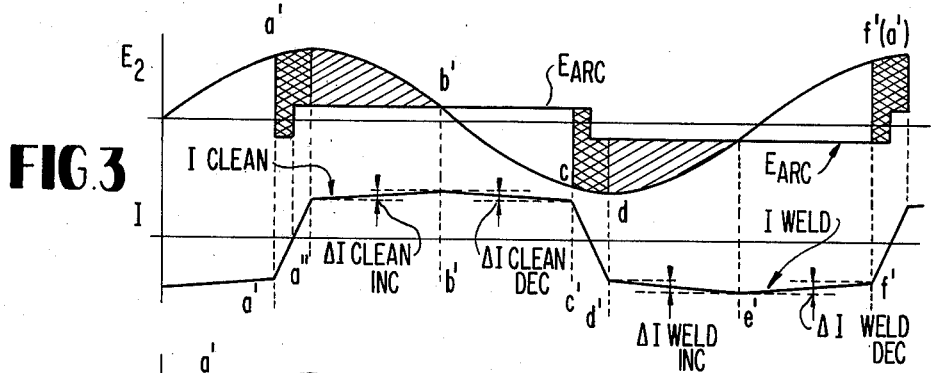
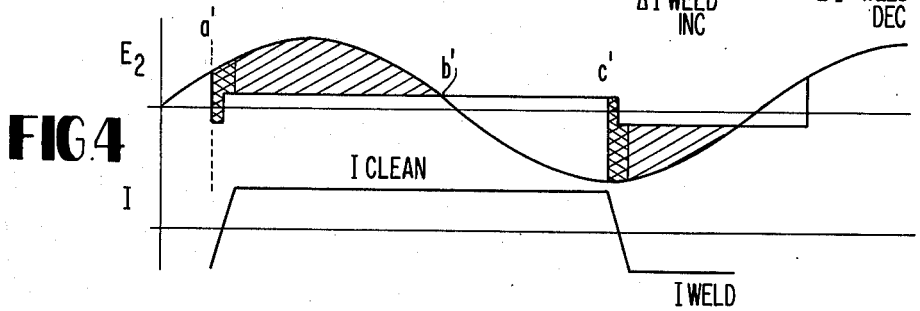
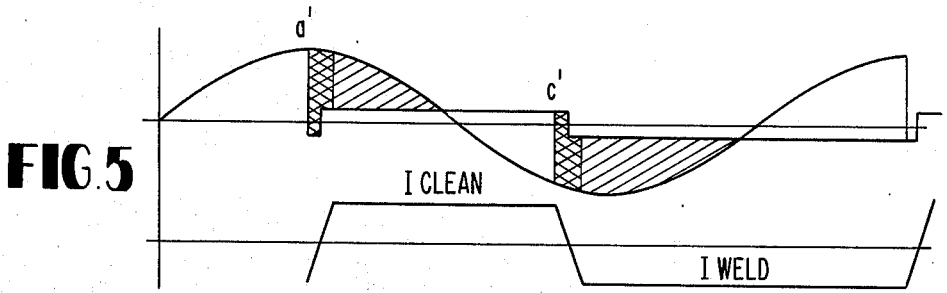

ASYMMETRICAL A.C. WELDER

BACKGROUND OF THE INVENTION

1. Field of the Invention

The invention relates primarily to the field of A.C. arc welding and, more particularly, to an apparatus and method for deriving from an A.C. source a square-wave current whose voltage at each polarity reversal is high enough to insure conduction when the work piece is aluminum, and whose positive and negative half-cycles may be individually controlled in both height and duration.

2. Description of the Prior Art

In the prior art one common solution to overcoming the problem of rectification and tungsten migration in the arc welding of aluminum has been to employ a balanced wave supply as shown, for example, in U.S. Pat. No. 2,472,323. The balanced wave supply consists of a capacitor in series with an A.C. supply. Most of the source voltage drops appears across the capacitor, and no D.C. component due to rectification can develop because the capacitor will conduct only A.C. In addition, a voltage, equal to the peak of the supply voltage plus the voltage due to the charge on the capacitor remaining after a forward half-cycle of conduction, is available to force reverse conduction when electrons are poorly emitted by the aluminum work piece. However, such a balanced wave supply is very large and expensive due to the need for a variable A.C. voltage and a large bank of capacitors.

The less expensive power supplies for gas tungsten arc welding (GTAW) or TIG welding of aluminum utilize magnetic amplifiers or saturable reactors which provide control of the conduction angle on each half-cycle. However, the conduction angle becomes unbalanced on alternate half-cycles due to the larger voltage drop when the aluminum must emit, thereby resulting in unequal reset of the reactor cores. Furthermore, the wave shape of the welding current in this type of phase-control power supply is more peaked than a sine wave and can result in both tungsten migration due to the intensity of electron emission by the tungsten on the forward half-cycle and also overheating and excessive melting of the tungsten during the reverse half-cycle when the tungsten absorbs bombarding electrons.

Back-to-back thyristors or a triac can provide either balanced or selectively unbalanced conduction on the forward and reverse half-cycle, but again the resulting large current peaking is worse than a sine wave. Furthermore, if an inductor is used in the A.C. line to reduce peaking, it will have the correct inductance for only one current level, whereas a wide range of current levels must be accommodated in actual practice.

In addition, resistance has been added in series with such phasecontrol supplies in an attempt to obtain a depeaking effect proportional to the welding current, but this technique is only partially successful and requires a larger supply due to poor efficiency.

Another attempted solution of the prior art has been to add a diode bridge in series with the A.C. line with an inductor connected across the D.C. terminals of the bridge. Such an arrangement is shown in U.S. Pat. No. 3,364,334, for example. However, in such an arrangement, the bridge is not the control element, and the welding current control must still be provided on the A.C. lines. Such a diode bridge is also incapable of producing an asymmetrical square-wave (i.e., one in which the adjacent positive and negative half-cycles are of different widths) which is highly desirable for preventing tungsten migration when welding aluminum. Such a circuit also suffers severe inadequacies due to the fact that the diodes form a freewheeling path at all times. This prior art circuit will be described in more detail below.

SUMMARY OF THE INVENTION

By contrast, the present invention eliminates the need for a variable A.C. source for controlling the welding current. Furthermore, the inductor in the controllable thyristor bridge is not allowed to free-wheel at each polarity reversal of the sinusoidal voltage waveform of the supply, but, instead, is controlled to free-wheel only after a voltage reversal; therefore, the inductor can absorb very large amounts of volt-seconds for subsequent delivery to the arc, has all the attributes of a D.C. stabilizing inductor, and will induce any amount of voltage necessary to cause the arc to burn through dirt and oxides. Furthermore, the square-wave welding current can be made as unsymmetrical as desired, with adjacent positive and negative half-cycles always totaling 360°. In addition, the positive or clean half-cycles can be made lower or higher in amplitude than the negative or weld half-cycles by the addition to the inductor of a second winding which is magnetically additive or subtractive and by selectively inserting such an additional winding with an electronic switch.

Therefore, the broad object of the invention is to provide an improved method and apparatus for A.C. gas tungsten arc welding (GTAW) or TIG welding, while also providing for D.C., TIG, STICK and MIG welding, and doing so at a very low cost while requiring only single phase power.

A more specific object of the invention is to provide a welding power supply which produces essentially square waves of current that are adjustable in amplitude and in width with the sum of the widths of adjacent pairs of positive and negative half-cycles equalling 360° of the line voltage frequency.

Another object is to provide a highly inductive square wave current source for welding.

Another object is to provide a welding power supply which produces a high voltage for forcing aluminum work to emit electrons at the beginning of each clean or negative half-cycle, and to do so on a narrow pulse basis to avoid shock hazard to the operator.

Another object is to provide an adjustable square wave current welding power supply wherein the height of adjacent half-cycles can be any desired ratio to minimize the possibility of tungsten migration during the welding of aluminum.

Another object of the invention is to provide an improved D.C. power supply for STICK, TIG and MIG welding.

BRIEF DESCRIPTION OF THE DRAWINGS

FIG. 1 is a schematic circuit diagram of a prior art A.C. welding power supply.

FIG. 2 is a schematic circuit diagram of a preferred embodiment of Applicant's improved power supply.

FIG. 3 is a graph showing various waveforms explanatory of the operation of Applicant's preferred embodiment of FIG. 2.

FIGS. 4 and 5 are graphs showing additional waveforms obtainable by the circuit of FIG. 2.

DETAILED DESCRIPTION OF THE PREFERRED EMBODIMENTS

Figure 6:
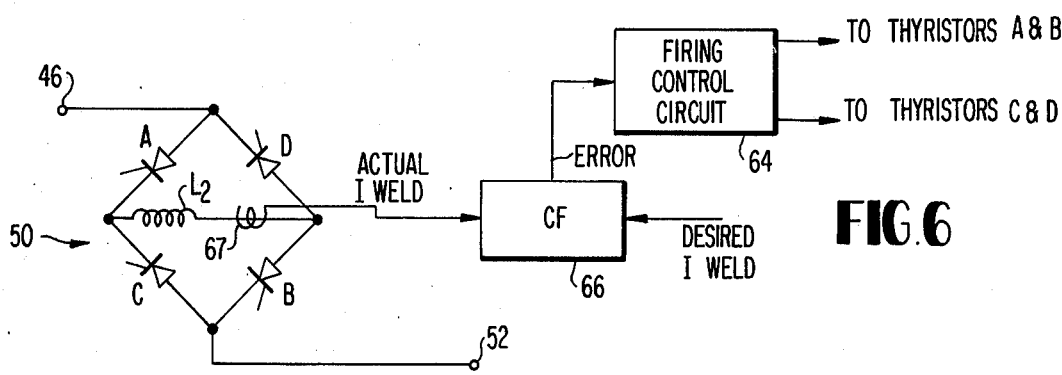
FIG. 6 is a general schematic diagram of a thyristor firing control circuit for use with the improved power supply of FIG. 2.

FIG. 1 is a schematic circuit diagram of a prior art A.C. welder supply of the type shown in the aforementioned U.S. Pat. No. 3,364,334. In this prior art circuit, a variable A.C. source is connected across the input terminals 10 and 12 of a welding transformer across whose secondary output terminals 14 and 16 appears the single phase A.C. voltage $E_2$. A diode bridge 18 is connected in series between the terminal 14 and the welding electrode terminal 20. The terminal 22 is connected to the work to be welded, and during welding an arc is struck between the electrode and the work. The external bridge terminals 24 and 26 are termed the A.C. terminals of the bridge, while the internal terminals 28 and 30 are termed the D.C. terminals of the bridge. An inductor L is connected between the D.C. terminals 28 and 30. The bridge consists of four arms, each containing a diode poled in the direction shown for supplying current to the arc, and also for providing a free-wheeling path for conducting current each time the voltage $E_2$ reverses polarity.

For example, when terminal 14 is positive, current flows in the path formed by terminals 14 and 24, diode $D_1$, terminal 28, the inductor L, terminal 30, the diode $D_3$, and the terminals 26, 20, 22 and 16.

When the terminal 16 is positive, the current flows through the path defined in sequence by terminal 16, terminal 22, the arc, terminal 20, terminal 26, diode $D_2$, terminal 28, inductor L, terminal 30, diode $D_4$, and the terminals 24 and 14. For both polarities of $E_2$, the current flows in the same direction through the inductor L.

In this prior art circuit, the diode bridge is connected in series with one side of the A.C. line with the inductor L on the inside or D.C. side of the bridge. In such a circuit, the bridge is not the control element, however, and the control must still be provided on the A.C. lines. Furthermore, such a circuit cannot provide an asymmetrical wave which is highly desirable for preventing tungsten migration when welding aluminum. This circuit also suffers severe inadequacies because of the fact that the bridge diodes provide a free-wheeling path for the inductor L at all times.

More specifically, in the steady state, an inductor can absorb only as many volt-seconds as it is subsequently able to put back into the circuit. Volt-seconds is a quantity having the dimension of magnetic flux and is equal to the area under a curve representing the inductor voltage $e_{inductor}$, as a function of time t:

$$e_{inductor} = N \, d\phi / dt$$
$$edt = N \, d\phi$$

$$\int_0^{t_1} edt = N \Delta \phi \text{ volt-seconds (or Weber linkages)}$$

where N is the number of inductor turns, and $\phi$ is the magnetic flux linking these turns.

Also, since $$e_{inductor} = L \frac{di}{dt}, \text{ then}$$

$$\int_0^{t_1} edt = L \Delta i \text{ volt-seconds}$$

In the steady state the increase in flux $\Delta\phi$, will be followed by an equal decrease therein during each half cycle. Both the increase and decrease are centered about a mean value determined by the D.C. current flowing in the inductor L. In this circuit, it will be noted that the inductor current never goes to zero, since it can always free-wheel through the bridge diodes. More specifically, when the inductor voltage appearing on terminal 30 is positive and higher than the voltage appearing on the A.C. line terminal 24, a free-wheeling path for the inductor current is provided by both diode $D_4$ and diode $D_1$ connected in series, and by diodes $D_3$ and $D_4$ connected in series.

Thus the amount of volt-seconds that can be absorbed by the inductor L is very small, since the inductor sees an electrical potential of only two diode voltage drops (approximately 0.6 volts each) when it is in the decreasing flux mode. The volt-seconds absorbed are therefore approximately:

$$(t_2 - t_1) \times 2 \times 0.6V = (t_2 - t_1) \, 1.2V$$
$$\underbrace{\phantom{2 \times 0.6V}}_{\substack{\text{diode} \\ \text{drop}}}$$

where $t_2 - t_1$ is the time required for the current in the transformer T to reverse in polarity when the line voltage reverses, and is a few milliseconds at most.

The inductor L therefore is very limited in its ability to absorb volt-seconds when the instantaneous secondary voltage $E_2$ is larger than the arc or load voltage $E_{arc}$, and a very small degree of squaring up of the transformer secondary is all that can be obtained, irrespective of how large the inductance is, since the voltage absorption is limited to the volt-seconds of the decrease diode drop just described.

In addition to this limitation, the D.C. inductor L can never behave in the fashion of a D.C. stabilizing inductor which normally serves the purpose of maintaining current flowing through the welding arc even in the presence of non-conducting dirt and oxides on the work.

The inductor L can never induce any significant voltage to add to the transformer secondary voltage $E_2$, since the diodes clamp such induced voltage to essentially zero. This result can also be seen from the fact that an inductor cannot continuously absorb watt-seconds (energy). It can absorb only an amount of energy equal to what it puts back into the circuit during another portion of the cycle. Since free-wheeling prevents the inductor from putting out more than the trivial amount of energy transferred to the diodes, it can only absorb a trivial amount.

FIG. 2 is a schematic diagram of a preferred embodiment of the invention for A.C. and D.C. TIG and STICK welding.

A single-phase A.C. power source is connected across the input terminals 42 and 44 of a welding transformer $T_1$ which produces across the secondary or output terminals 46 and 48 a voltage $E_2$ typically equal to 80 volts. A controlled rectifier bridge 50 is connected in series with one side of the output of the transformer by connecting it between the terminal 46 and the output or electrode terminal 52. Terminal 54 is connected to the work to be welded. The welding arc is thus formed between the terminals 52 and 54, and the voltage of the arc is designated $E_{arc}$. Also connected across the terminals 52 and 54 are a resistor $R_2$ and a series-parallel circuit consisting of a parallel-connected resistor $R_1$ and a diode $D_5$ connected in series with a capacitor $C_1$.

The bridge 50 consists of four arms including the thyristors A, B, C and D, respectively. The bridge is connected in the circuit by its external or A.C. terminals 56 and 58, and an inductor $L_2$ is connected across the internal or D.C. terminals 60 and 62 of the bridge. The primary and secondary leakage reactances of the transformer $T_1$ are designated $L_P$ and $L_S$ respectively.

The circuit configuration shown in FIG. 2 is that used for A.C. welding. For D.C. welding, the A.C. output load terminals 52 and 54 are short-circuited, and the inductor $L_2$ is connected in series with the welding electrode and work. In FIG. 2, this may be accomplished by moving switches SW5 and SW6 to their "D.C." contacts so that the arc is formed between the D.C. load terminals 53 and 55.

The D.C. inductor $L_2$ in FIG. 2 has considerably larger inductance than would be possible for an A.C. inductor connected directly in the A.C. path between the transformer $T_1$ and the electrode terminal 52 in the absence of the controlled rectifier bridge 50, because the voltage drop through such a large A.C. inductor would be excessively large.

The thyristors A, B, C and D are selectively fired or rendered conducting by means of firing pulses produced by a suitable firing control circuit 64.

In typical operation of the circuit in FIG. 2, and with reference to the waveforms shown in FIG. 3, thyristors A and B would be fired at the point $a'$ of the secondary voltage waveform $E_2$. Steady state operation is assumed, i.e., thyristors C and D had been conducting at the time immediately preceding the point $a'$, and energy and volt-seconds stored in the inductor $L_2$ had been inducing a voltage sufficient to maintain the flow of welding current in a negative direction in opposition to the voltage $E_2$ which has a positive polarity at time $a'$.

Consequently, when thyristors A and B are fired, the inductor $L_2$ will free-wheel through the path formed by the thyristors D and A, and also through the path formed by the thyristors B and C, and the induced inductor voltage will drop to near zero, as this induced voltage will consist only of two thyristor voltage drops of 1.2 volts each, or a total of 2.4 volts. For all practical purposes, the existence of these free-wheeling paths reduces the bridge to a closed-knife switch or short circuit.

At the instant $a'$ of firing the thyristors A and B, the current in the leakage reactances $L_P$ and $L_S$ of the transformer had been equal to the current flowing in the bridge inductor $L_2$. This small leakage inductance now must induce sufficient voltage by itself to oppose the transformer voltage, and the stored energy is quickly expended, as can be seen by the ramp change in the welding current I from its negative value at $a'$ to a positive value at $a''$. The slope of this current ramp between $a'$ and $a''$ is defined by:

$$\frac{di}{dt} = \frac{(E_2 + E_{arc})}{(L_P + L_S)}$$

where $E_2$ is the instantaneous value of the waveform $E_2$, and $E_{arc}$ is the arc plasma voltage, typically 20 to 30 volts for argon.

When the current ramp reaches the value of the inductor current free-wheeling in the bridge (i.e., at point $a''$) and tries to exceed it, the thyristors C and d become back-biased and are turned off or rendered nonconducting at this point $a''$. The welding current I then continues to ramp at a very slow rate of:

$$\frac{di}{dt} = \frac{(E_2 - E_{arc})}{(L_P + L_S + L_2)}$$

until $E_2$ becomes less than $E_{arc}$ at time $b'$.

The total increase I of the welding current I between points $a''$ and $b'$ is defined by:

$$\Delta I_{clean} = \frac{1}{(L_P + L_S + L_2)} \int_{a''}^{b'} (E_2 - E_{arc}) \, dt$$

$\Delta I$ can be referred to as the "clean increase" volt-seconds per Henry.

The secondary voltage $E_2$ then decreases through zero to a negative value at time $c'$. From time $b'$ to $c'$, the inductor $L_2$ will induce a voltage sufficient to maintain the positive or "weld" direction of current flow through the arc despite the polarity reversal of the voltage $E_2$. Thyristors C and D are purposely not turned on during this time interval, and hence, remain blocking or non-conducting during the interval to prevent freewheeling of the inductor $L_2$. This operation represents an important difference with respect to the operation of the prior art circuit shown in FIG. 1 wherein the diodes substantially immediately provide a free-wheeling path for the inductor upon every reversal of the secondary voltage $E_2$.

At point $c'$, the thyristors C and D are fired or rendered conducting. It is important to note that the point $c'$ need not have the same phase relative to the negative half-cycle of the line voltage $E_2$ as the point $a'$ has relative to the preceding positive half-cycle of $E_2$. An important feature of the invention is that the firing point $c'$ for the thyristors C and D is adjustable and can be made equal to, much earlier than, or later than, the firing point $a'$ for the thyristors A and B.

In FIG. 3, the points $a'$ and $c'$ are shown as having approximately the same phase relative to their corresponding half-cycles of the line voltage $E_2$, thereby resulting in a balanced or symmetrical welding current wave I. By contrast, FIGS. 4 and 5 show examples of unsymmetrical welding current conduction which is of great significance in A.C. TIG welding.

Returning to FIG. 3, when thyristors C and D are fired, the inductive current again free-wheels through the thyristors as the welding current ramps down to a negative value at $d'$ under the control of the voltage $E_2$ which is already negative. The slope of this ramp is the same as the previously described positive current ramp. When the welding current I reaches the magnitude of the free-wheeling current flowing in the inductor $L_2$ at time $d'$, the thyristors A and B become back-biased, free-wheeling ceases, and the negative welding current increases in magnitude to the point $e'$ at which the line voltage $E_2$ becomes equal to the arc voltage $E_{arc}$. The positive current I is designated $I_{clean}$ and the positive half-cycle of the arc current is also termed the cleaning cycle. After time $e'$, the line voltage $E_2$ increases upwardly through zero to a positive value at time $f$, which corresponds to the previous point $a'$, and the sequence is repeated.

In all cases, that is, the balanced supply as shown in FIG. 3, and the unbalanced supplies as shown in FIGS. 4 and 5, the cross-hatched areas or "increase" volt-seconds over a full cycle of current I are equal to the blank areas or "decrease" volt-seconds. Such a condition defines steady state operation.

However, it is not necessary for the increase volt-seconds to equal the decrease volt-seconds in any given half-cycle of current I. Moving the firing point $c'$ of the thyristors C and D from a point of relative phase symmetry (180°) with respect to the firing point $a'$ of the thyristors A and B, for example, to a point more than 180° later, such as shown in FIG. 4, will make the blank area or decrease volt-seconds between the points $b'$ and $c'$ larger during the half-cycle of weld current $I_{clean}$, and will simultaneously make the blank area or decrease volt-seconds in the negative or cleaning half-cycle of current $I_{weld}$ correspondingly smaller. Hence, over a full cycle of the current, i.e., including adjacent half-cycles of $I_{weld}$ and $I_{clean}$, the increase volt-seconds are equal to the decrease volt-seconds, thereby defining a steady state operation. While the transformer current is reversing between points $c'$ and $d'$, for example, the inductor is free-wheeling, and no change in inductor current occurs since volt-seconds are neither absorbed nor paid out. The double cross-hatched area correspond to this interval.

To obtain a desired increase in the amplitude or height of the current wave I independent of the relative widths of the positive and negative half-cycles of the current, the firing points $a'$ and $c'$ are both moved to the left, or earlier in time than that indicated in FIG. 3, and to obtain a desired decrease in the height of the current wave, these firing points are moved to the right or to a later time than those shown in FIG. 3.

As shown schematically in FIG. 6, this adjustment in the amplitude of the arc current I can be accomplished by using a current regulator or comparator 66 ot compare a desired value of the current I with the D.C. current flowing through the inductor $L_2$ as sensed by a current transformer 67 on a Hall device, and then automatically positioning the thyristor firing points $a'$ and $c'$ by the firing control circuit 64 in response to the current error.

Figure 8:
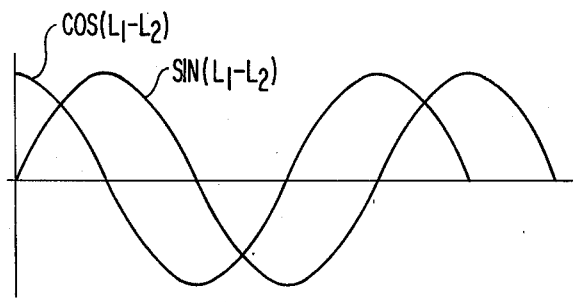
FIG. 8 illustrates two waveforms produced in the circuit of FIG. 7.
Figure 7:
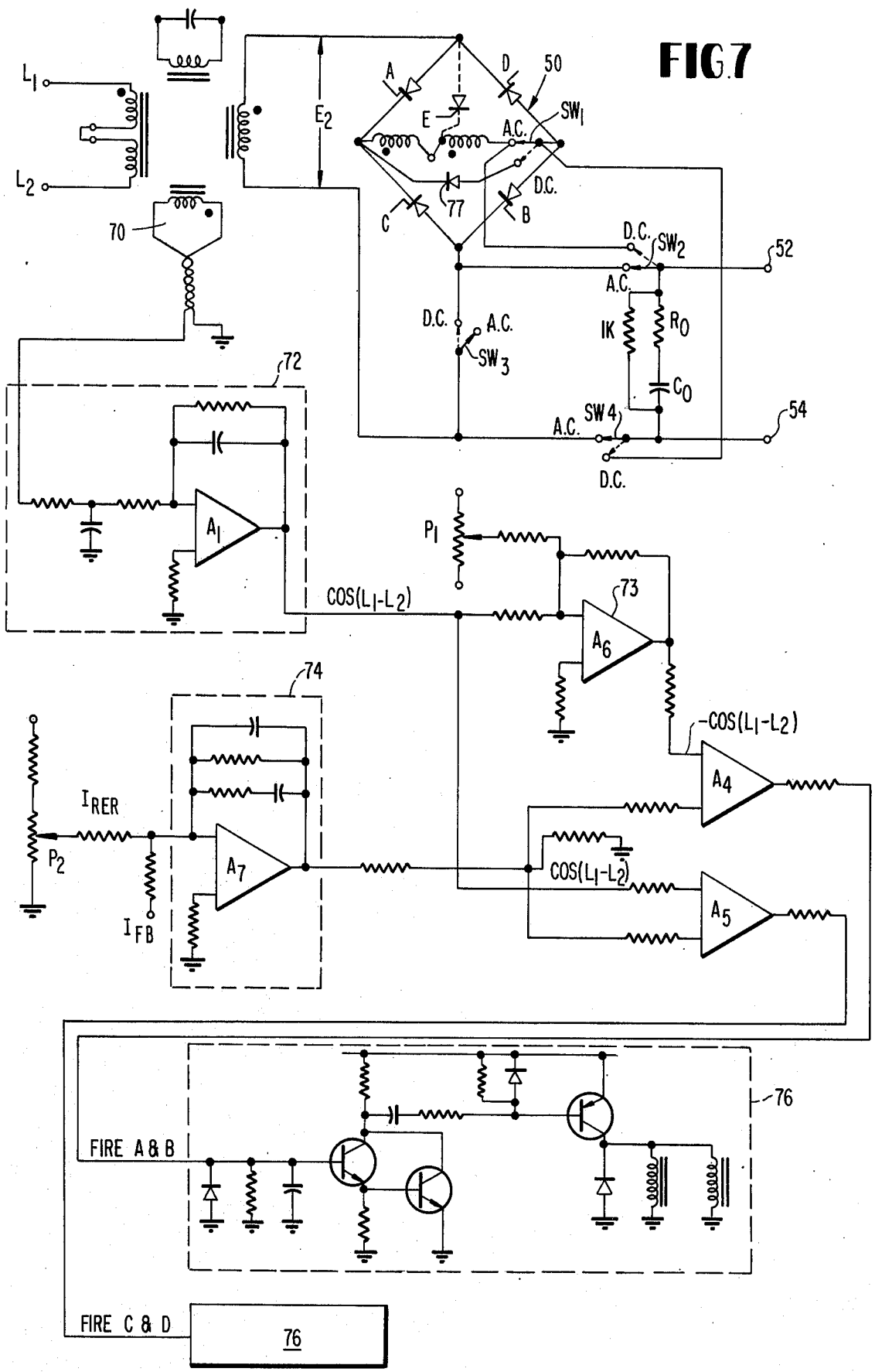
FIG. 7 is a detailed schematic circuit diagram of the preferred embodiment of the power supply including a thyristor firing control circuit.

A preferred embodiment of the invention including the thyristor firing control circuit for amplitude control is illustrated in FIG. 7. A voltage proportional to the transformer's secondary voltage $E_2$ is induced in a coil 70 wound on the core of input transformer T1 and integrated to produce an A.C. signal $\cos(L_1 - L_2)$ displaced 90° from the $E_2$ sine wave $\sin(L_1 - L_2)$, as illustrated in FIG. 8. This integration is performed by the integrator 72. More specifically, assuming that the secondary voltage $E_2$ is defined as $E_1 \sin\omega t$, then the so-called cosine signal has the form of $E_2 \cos\omega t$.

The $\cos(L_1 - L_2)$ signal is applied to the upper input of a switching amplifier $A_5$. The $\cos(L_1 - L_2)$ signal also is inverted by an inverter 73 and applied as a $-\cos(L_1 - L_2)$ signal to the upper input of a switching amplifier $A_4$. The setting of a potentiometer P1 connected to the input of the inverter may be adjusted to obtain the desired unbalance in the firing of the thyristors in the bridge 50.

A voltage signal $I_{FB}$, proportional to the actual welding current, is applied to the input of a current regulator 74 together with a signal $I_{REF}$ proportional to a reference or desired welding current. Signal $I_{FB}$ is derived from a current sensing device (not shown), such as a Hall device connected in series with the inductor $L_2$ in the bridge 50. The signal $I_{REF}$ is obtained from a potentiometer P2. The output of regulator 74 is a signal $-E_{sig}$ proportional to the difference between $I_{REF}$ and $I_{FB}$.

Figure 9:
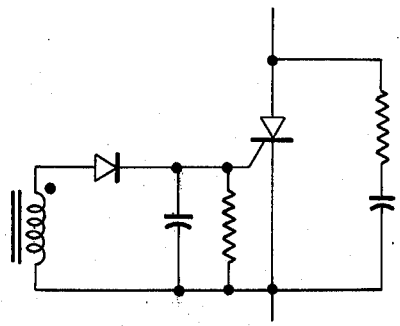
FIG. 9 is a schematic circuit diagram of a typical thyristor circuit used in FIGS. 2 and 7.

The $-E_{sig}$ is applied to the lower inputs of switching amplifiers $A_4$ and $A_5$ for comparison with the $-\cos(L_1-L_2)$ and $+\cos(L_1-L_2)$ signals, respectively. The outputs of amplifiers $A_4$ and $A_5$ switch to positive levels when the $-E_{sig}$ signal intersects the $-\cos(L_1-L_2)$ and $+\cos(L_1-L_2)$ signals, respectively, to produce the corresponding thyristor control signals "FIRE A & B" and "FIRE C & D". These thyristor control signals are then applied to respective identical thyristor firing circuits 76 which produce thyristor firing pulses which are coupled by pulse transformers PT to the gate electrodes of the corresponding thyristors in bridge 50. For example, the firing pulses for thyristors A and B are coupled by pulse transformers PT-A and PT-B to the gate electrodes A and B. The circuit of the typical thyristor A is shown in FIG. 9.

The firing point $a'$ in FIG. 3 is determined by the point at which the current signal intercepts the + cosine wave, and $c'$ is determined by the intercept with the − cosine wave. The imbalance is developed by raising or lowering the + cosine wave by a bias amount determined by the setting of the potentiometer P1. It may also be accomplished by dividing the current error signal $-E_{sig}$ down with a pot before it is used to intercept the + cosine wave. In this latter case dividing the signal to zero by turning the pot to ground corresponds to placing $c'$ at the 90° point of the negative $E_2$ half cycle, and provides a maximum forcing voltage to establish reverse conduction when the aluminum work emits electrons poorly.

When D.C. welding, it is desirable to allow inductor $L_2$ to free-wheel every time the line voltage goes through zero. This is conventional controlled rectification. The free-wheeling can be obtained by connecting a free-wheeling diode 77 from the negative side of the bridge to the positive side, or by pulsing two SCR's in series to create a free-wheeling path each time the voltage goes through zero, for example through A and D or through C and B. For D.C. welding, the switches SW1, SW2, SW3 and SW4 are switched to their dashed line positions to engage their "D.C." contacts.

To obtain a height change between current on adjacent half-cycles, such as 2 to 1 or 4 to 1 change, an optional thyristor E can be fired instead of A. This can be used on D.C. welding to obtain a digging characteristic in the arc when the arc length, and hence voltage, are low due to molten metal transferring from electrode to work. A doubling of current can be obtained very quickly by this means because the field of $L_2$ requires constant ampere turns, and firing E instead of A provides fewer turns, and hence I must jump to a higher level.

This height change is also usable in A.C. TIG welding where tungsten heating can be reduced, not only by providing a narrower clean half-cycle than the weld half-cycle, but also by providing fewer turns on $L_2$ in the weld current path, so that the weld current will be greater than the clean current.

I claim:

1. A controllable power supply for supplying substantially sqaure waves of current to a welding arc, and comprising:

a single phase, A.C. power source;

a circuit connected in series between said source and said arc, and including first and second controllable, alternately conducting, current paths for supplying current in respectively opposite and mutually exclusive polarities to said arc;

inductor means connected in said current paths, such that the arc current supplied from said source flows in the same direction in seies through said inductor means irrespective of the polarity of the arc current;

control means for rendering said first current path conducting at a selected non-zero value of a positive polarity half-cycle of the source voltage while said arc current is of negative polarity and is being supplied through the conducting second current path by inductive current from said inductor, whereby a free-wheeling path is formed through said current for said inductive current and whereby the positive source voltage causes said arc current to reverse to a positive polarity, said second current path being rendered non-conducting when the positive arc current exceeds the free-wheeling inductive current;

said inductor self-inducing a positive polarity voltage to maintain the positive arc current when the source voltage falls below the arc voltage and reverses polarity at the next negative half-cycle thereof;

control means for rendering said second current path conducting at a selected non-zero value of said next negative half-cycle of the source voltage, again to form said free-wheeling path, so that said source voltage causes said arc voltage and arc current to reverse to a negative polarity; and means for independently selecting said non-zero values of said positive and negative source voltage half-cycles such that said values have different phases relative to their respective source voltage half-cycles, whereby the corresponding positive and negative half-cycles of arc current have different durations to provide an unbalanced power supply.

2. A controllable power supply as defined in claim 1, wherein said circuit comprises a full wave thyristor rectifier bridge connected by its two A.C. terminals in series between said A.C. source and said arc, wherein said inductor means comprises an inductor connected between the D.C. terminals of said bridge;

wherein said bridge comprises four thyristors, each connected in a different arm of said bridge so that said first current path is formed by a first pair of said thyristors, and said second current path is formed by the second pair of said thyristors;

wherein said control means for rendering said first and second current paths conducting comprises a thyristor firing control circuit for rendering conducting said first and second pairs of thyristors at the selected non-zero values of said positive and negative polarity half-cycles, respectively, of said source voltage; and further comprising a fifth thyristor connected to an intermediate point of said inductor and in parallel with one of said four thyristors, and wherein said control circuit renders conducting said fifth thyristor instead of said one thyristor, so that the current path including said fifth thyristor includes a fewer number of inductor turns than the other current path, whereby the current flowing through the current path including said fifth thyristor is substantially greater than the current flowing in said other current path, because of the requirement that said inductor maintain the same ampere-turns regardless of which of said current paths in conducting.

* * * * *